(12) United States Patent
Matsutani

(10) Patent No.: US 7,831,557 B2
(45) Date of Patent: Nov. 9, 2010

(54) TRANSFER APPARATUS, TRANSFER METHOD, AND TRANSFER PROGRAM

(75) Inventor: Atsushi Matsutani, Tokyo (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 11/559,095

(22) Filed: Nov. 13, 2006

(65) Prior Publication Data

US 2007/0143346 A1  Jun. 21, 2007

(30) Foreign Application Priority Data

Dec. 9, 2005  (JP) ............................... 2005-356973

(51) Int. Cl.
*G06F 7/00* (2006.01)
(52) U.S. Cl. ..................... 707/626; 707/621; 707/655; 707/695; 707/704
(58) Field of Classification Search .................. 707/10, 707/103 Y, 104.1, 758, 828, 621, 626, 655, 707/695, 704; 700/94; 705/26, 1; 725/80; 345/810; 386/125; 709/217; 455/557
See application file for complete search history.

(56) References Cited

U.S. PATENT DOCUMENTS

| 6,804,537 | B1 * | 10/2004 | Fujii | 455/557 |
| 7,191,190 | B2 * | 3/2007 | Debique et al. | 707/104.1 |
| 2002/0156546 | A1 * | 10/2002 | Ramaswamy | 700/94 |
| 2002/0180803 | A1 * | 12/2002 | Kaplan et al. | 345/810 |
| 2004/0252985 | A1 * | 12/2004 | Nonaka et al. | 386/125 |
| 2005/0021414 | A1 * | 1/2005 | Liebenow | 705/26 |
| 2005/0055722 | A1 * | 3/2005 | Lym | 725/80 |
| 2006/0069740 | A1 * | 3/2006 | Ando et al. | 709/217 |
| 2007/0106551 | A1 * | 5/2007 | McGucken | 705/10 |
| 2008/0140433 | A1 * | 6/2008 | Levy et al. | 705/1 |
| 2009/0119013 | A1 * | 5/2009 | O'Malley | 701/211 |

FOREIGN PATENT DOCUMENTS

JP  2001-93226  4/2001

* cited by examiner

*Primary Examiner*—Thuy N Pardo
(74) *Attorney, Agent, or Firm*—Oblon, Spivak, McClelland, Maier & Neustadt, L.L.P.

(57) ABSTRACT

A transfer apparatus includes: a storage section configured to store a plurality of content data; a communication section configured to communicate with external equipment; and a control section configured to control the communication section in such a manner as to transfer content data from the storage section to the external equipment. The control section detects from the external equipment a logical node retaining content data of the same type as that of the content data to be transferred and, based on the result of the detection, designates a transfer destination before transferring the content data to the external equipment.

14 Claims, 11 Drawing Sheets

FIG.5
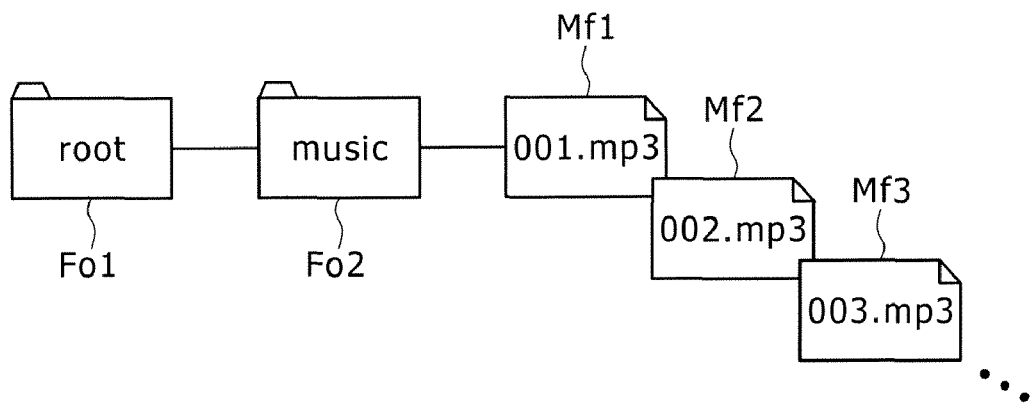
FIG.6A
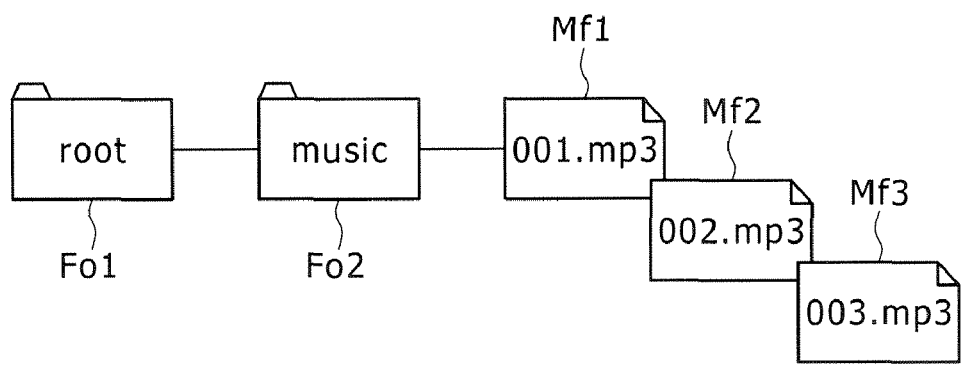
FIG.6B
./root/music/001.mp3
./root/music/002.mp3
./root/music/003.mp3

TRANSFERRED MUSIC FILE

./root/music/001.mp3
./root/music/002.mp3
./root/music/003.mp3
./root/music/004.mp3  ← TRANSFERRED MUSIC FILE

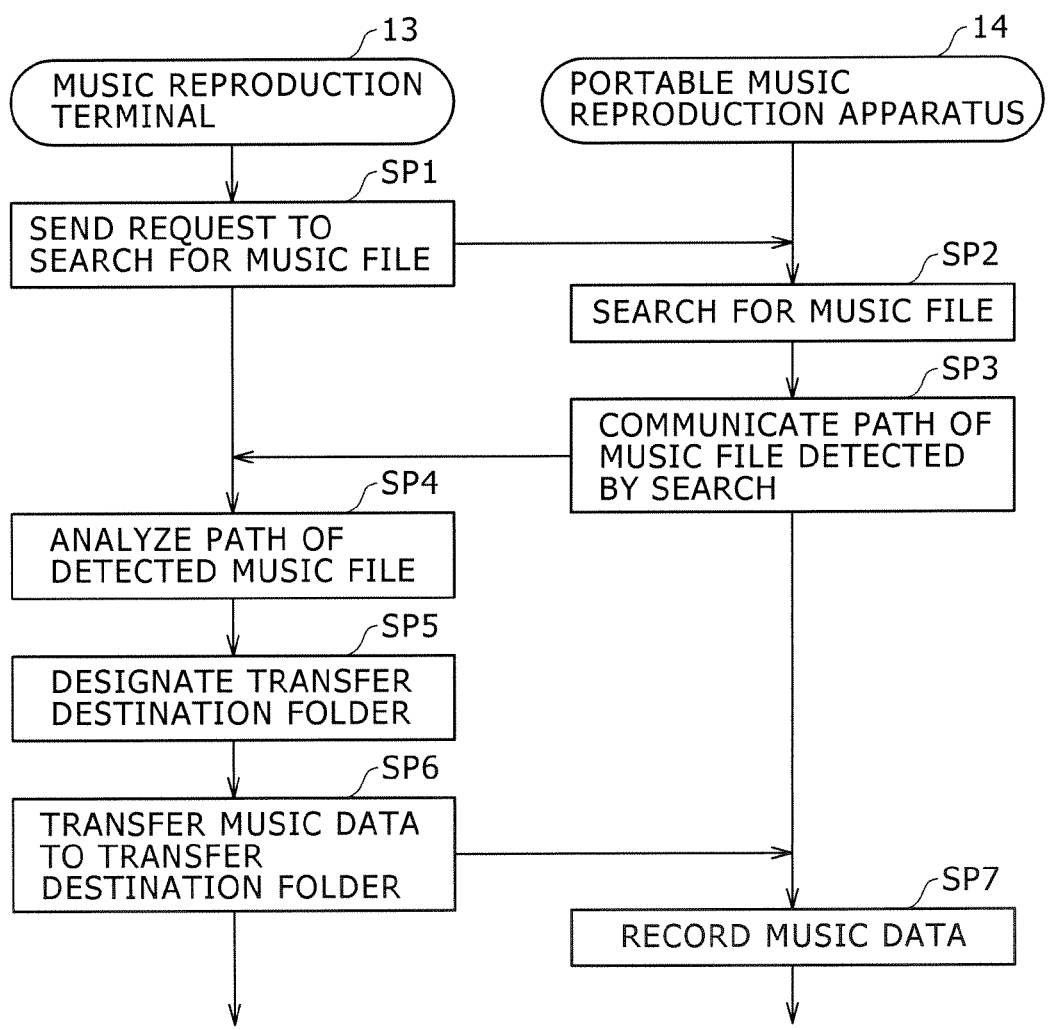

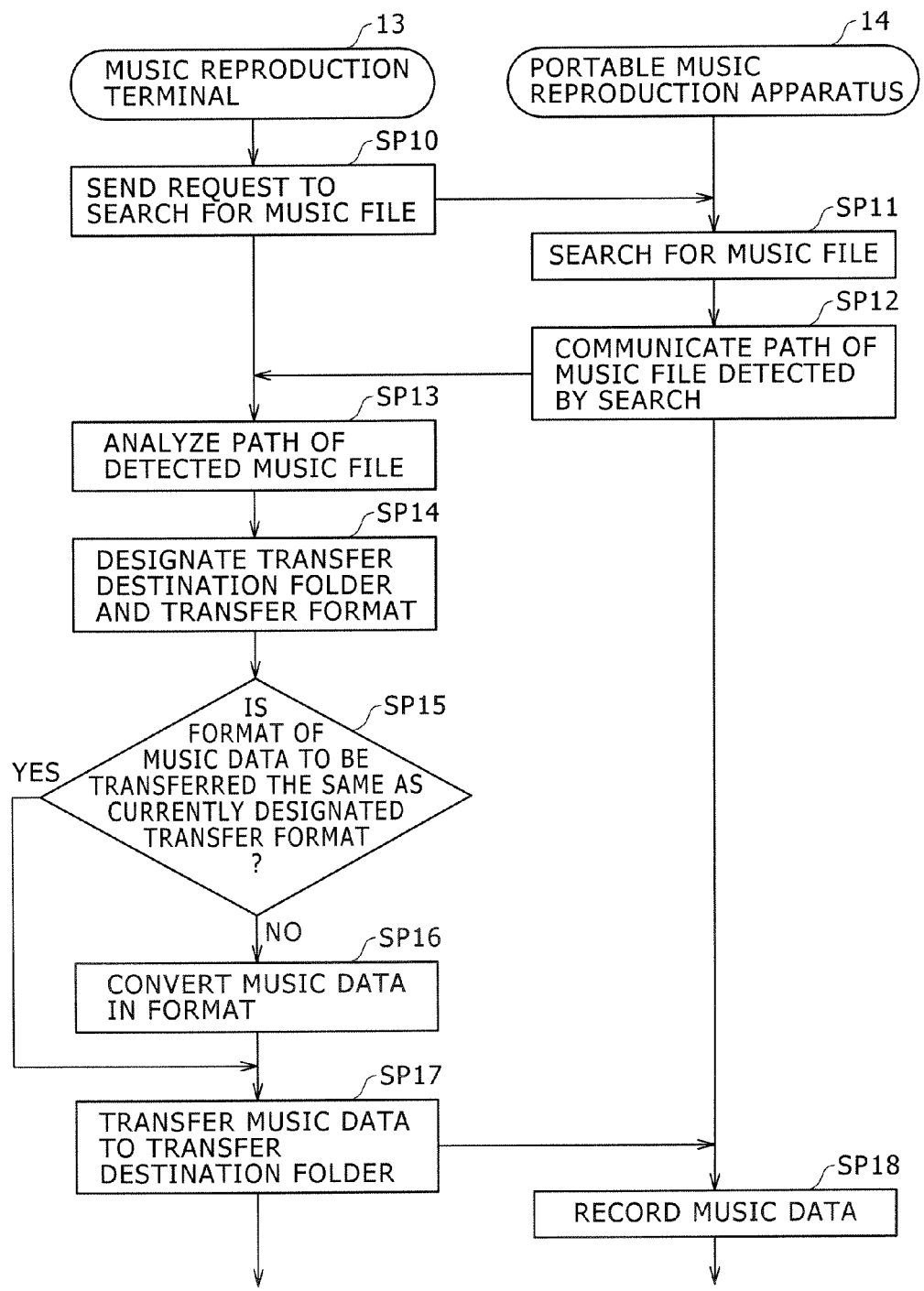

TRANSFER APPARATUS, TRANSFER METHOD, AND TRANSFER PROGRAM

CROSS REFERENCES TO RELATED APPLICATIONS

The present invention contains subject matter related to Japanese Patent Application JP 2005-356973 filed with the Japanese Patent Office on Dec. 9, 2005, the entire contents of which being incorporated herein by reference.

BACKGROUND OF THE INVENTION

1. Field of the Invention

The present invention relates to a transfer apparatus, a transfer method, and a transfer program. More particularly, the invention relates to a transfer apparatus, a transfer method, and a transfer program whereby content data is transferred to a content reproduction apparatus from a content storage apparatus that retains the content data.

2. Description of the Related Art

In the past, when a content storage apparatus had any of its stored content data selected by a user for transfer to a content reproduction apparatus, the content storage apparatus created a transfer list that listed content data identification information for identifying the selected content data. When the content reproduction apparatus was connected to the content storage apparatus, the content data identified by the content data identification information in the created transfer list was transferred from the content storage apparatus to the content reproduction apparatus (e.g., see Japanese Patent Laid-open No. 2001-93226).

The content reproduction apparatus would place into a suitable storage section the content data transferred from the content storage apparatus. Upon reproduction, the content reproduction apparatus would retrieve the content data from the storage section. In practice, the storage section had at least one folder (also called a directory) created inside as a logical node of content data. The content reproduction apparatus would store content data into such folders.

That is, the content reproduction apparatus would create a folder structure suitable for storage and management of content data in the storage section. With the folder structure in place, the content data would be classified and organized in units of folders.

SUMMARY OF THE INVENTION

In the above-described content reproduction apparatus, content data was shown classified and organized in units of folders for storage and management. For example, folders were typically designated beforehand so that music data would be stored into a folder "Music," video data into a folder "Movie, etc.

In the past, the user was prompted to designate on the content reproduction apparatus a destination folder to which to transfer content data from the content storage apparatus. Unless the user was familiar with how folders were structured (i.e., how contents were managed) in the content reproduction apparatus, it was difficult for the user to know which folder had been set to accommodate the transferred content data. Poor familiarity with the folder structure often left the user making mistakes when designating the transfer destination folder.

In practice, designating the wrong transfer destination folder could disable the content reproduction apparatus from reproducing it as well as from recognizing the transferred content data. For data reproduction, the user would be called on to execute complicated steps such as keeping the transfer destination folder in mind and designating the folder in question at reproduction time.

Meanwhile, there has been proposed a method involving installation into the content storage apparatus of a dedicated application for storing transfer-ready content data into a suitably designated folder designated in the content reproduction apparatus. The content storage apparatus would then utilize the dedicated application to transfer the target content data to the appropriate folder in the content reproduction apparatus.

However, the scheme for managing folders into which to store content data varies illustratively with the type and version of content reproduction apparatus. It is practically difficult to make all types and versions of content reproduction apparatuses compatible with such dedicated application software to be installed. If content data were to be transferred to a content reproduction apparatus incompatible with any of the dedicated applications, the user would still be demanded to designate the transfer destination folder.

As described, the user has typically been called on to become familiar with the content management of a given content reproduction apparatus in order to have content data transferred to and retained in the appropriate node that varies with the target apparatus. Upon data transfer, the user may need to specify a suitable node as the transfer destination. That is, there have been few easy ways in which to transfer content data to an appropriately designated transfer destination representing a node in the target content reproduction apparatus.

The present invention has been made in view of the above circumstances and provides a transfer apparatus, a transfer method, and a transfer program for easily transferring content data to a node appropriate to the content management scheme of the transfer destination.

In carrying out the invention and according to one embodiment, there is provided a transfer apparatus including a storage section, a communication section, and a control section. The storage section configured to store a plurality of content data. The communication section configured to communicate with external equipment. The control section configured to control the communication section in such a manner as to transfer content data from the storage section to the external equipment. The control section detects from the external equipment a logical node retaining content data of the same type as that of the content data to be transferred and, based on the result of the detection, designates a transfer destination before transferring the content data to the external equipment.

When the destination to which to transfer content data is automatically designated in the external equipment on the basis of the node where content data is already stored, there is no need for the user to carry out complicated operations for the transfer. The content data transfer destination is designated unattended in a suitable node conforming to the scheme of content management of the external equipment.

Where the transfer apparatus, transfer method, or transfer program according to one embodiment of the present invention is in use, the destination to which to transfer content data is set automatically in the external equipment based on the node inside where content data is currently retained. Freed of any complex setting procedure, the user simply lets the content data transfer destination be designated automatically in an appropriate node under the content management scheme of the external equipment. The content data of interest is then transferred with ease to the external equipment.

BRIEF DESCRIPTION OF THE DRAWINGS

Further objects and advantages of the present invention will become apparent upon a reading of the following description and appended drawings in which:

FIG. 5 is a schematic view showing a folder structure;

FIGS. 6A and 6B are schematic views showing folder contents before transfer;

FIG. 8 is a sequence diagram showing a transfer procedure of a first embodiment of this invention;

FIG. 11 is a sequence diagram showing a transfer procedure of a second embodiment of this invention;

DETAILED DESCRIPTION OF THE PREFERRED EMBODIMENTS

The preferred embodiments of the present invention will now be described with reference to the accompanying drawings.

(1) First Embodiment (1-1) Overview

Figure 1:
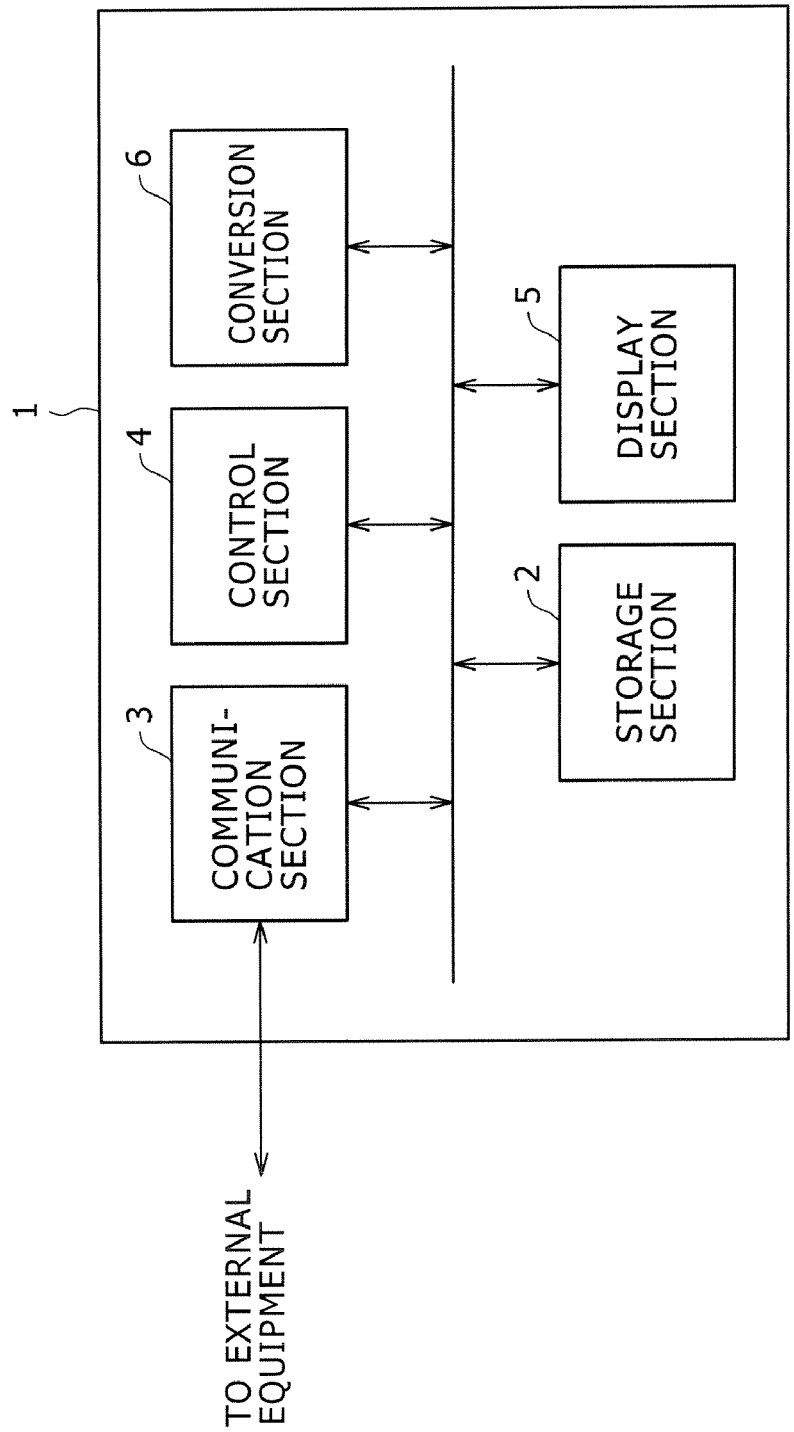
FIG. 1 is a schematic view outlining a transfer apparatus.

What follows is an overview outlining the first embodiment of the present invention in reference to FIG. 1. The overview will be followed by a more detailed description of the first embodiment.

A transfer apparatus 1 shown in FIG. 1 has a storage section 2 that stores a plurality of content data, a communication section 3 that communicates with external equipment, and a control section 4 that controls the communication section 3 in such a manner as to transfer content data from the storage section 2 to the external equipment. The control section 4 detects from the external equipment a logical node retaining content data of the same type as that of the content data to be transferred to the external equipment. Given the result of the detection, the control section 4 designates a transfer destination before transferring the content data to that destination.

In the transfer apparatus 1, as described, the destination to which to transfer content data is automatically designated in the external equipment on the basis of the node therein where content data is already stored. This eliminates the need for the user to carry out complicated operations for the transfer. The content data transfer destination is designated unattended in a suitable node conforming to the scheme of content management of the external equipment.

The transfer apparatus 1 may further include a display section 5. Illustratively, the external equipment arranged to accommodate content data in logical nodes of a hierarchical structure may be detected having a plurality of sibling nodes retaining content data of the same type as that of the content data to be transferred. In such a case, the control section 4 causes the display section 5 to display the plurality of nodes so that a user may select one of the displayed nodes. The control section 4 then designates the user-selected node as a transfer destination before transferring the content data of interest to that destination.

The transfer apparatus 1 may further include a conversion section 6 that converts content data in format. The control section 4 searches the content data in the external equipment for the format in use. If the format detected by the search is different from that of the content data to be transferred to the external equipment, then the control section 4 causes the conversion section 6 to convert the format of the content data to be transferred into the format of the content data in the external equipment, before transferring the content data to the external equipment.

(1-2) Structure of the Music Transfer System

Figure 2:
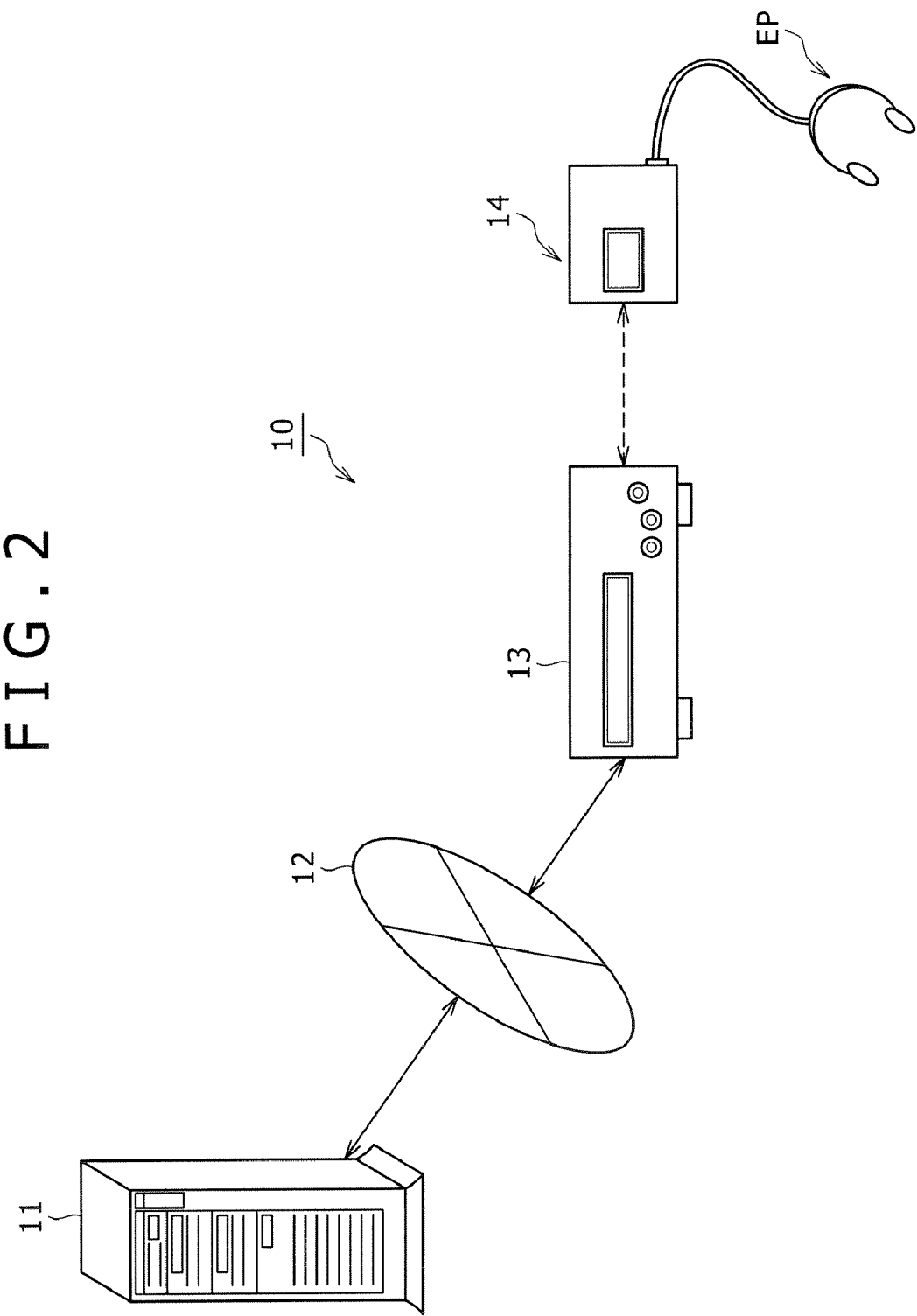
FIG. 2 is a schematic view showing a structure of a music transfer system.

In FIG. 2, reference numeral 10 denotes a music transfer system as a specific application of the above-described transfer apparatus 1. In the music transfer system 10, a music delivery server 11 delivers music data over a network 12 to a music reproduction terminal 13 for storage. When a portable music reproduction apparatus 14 is connected to the music reproduction terminal 13, the music data stored in the terminal 13 is transferred to the portable music reproduction apparatus 14 for storage. Typically, the portable music reproduction apparatus 14 is disconnected from the music reproduction terminal 13 when operated by the user for music data reproduction. The user's operation causes the portable music reproduction apparatus 14 to output music based on the music data through earphones EP plugged into the apparatus body. In this setup, the music reproduction terminal 13 corresponds to the transfer apparatus 1 discussed above.

Figure 3:
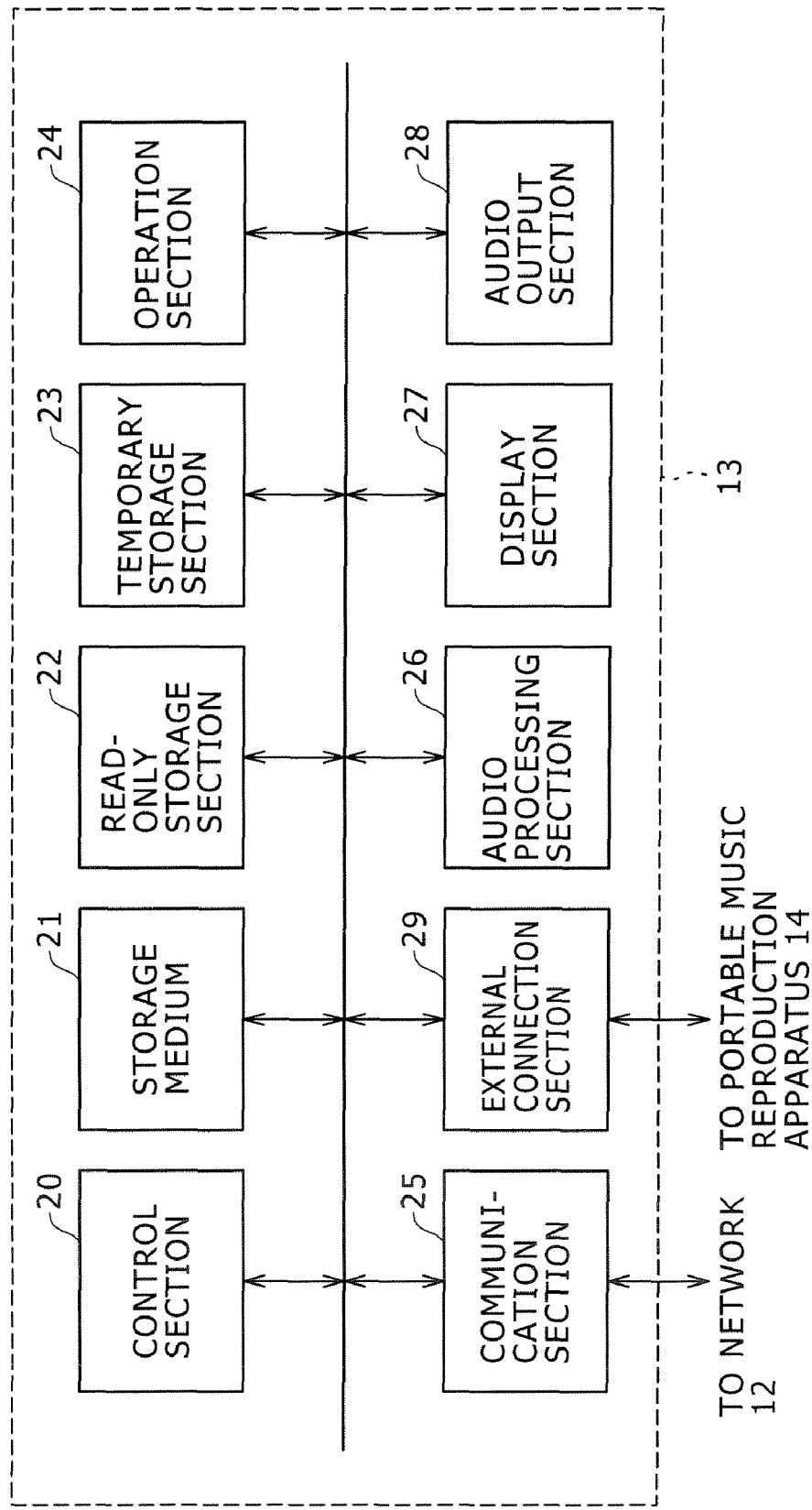
FIG. 3 is a schematic view showing a structure of a music reproduction terminal.

(1-3) Structures of the Music Reproduction Terminal and Portable Music Reproduction Apparatus The structure of the music reproduction terminal 13 will now be described, followed by a description of the structure of the portable music reproduction apparatus 14. Referring to FIG. 3, the music reproduction terminal 13 includes a control section 20, a storage medium 21, and a read-only storage section 22. The control section 20 performs various processes in keeping with the programs retrieved from the storage medium 21 composed of a storage apparatus such as a hard disk drive or from the read-only storage section 22 such as a ROM (read-only memory). The programs and data handled during the processes are held as needed in a temporary storage section 23 such as a RAM (random access memory).

More specifically, when the control section 20 recognizes that the user has performed an operation on an operation section 24 to acquire music data from the music delivery server 11 on the network 12, the control section 20 sends a delivery request signal accordingly to the music delivery server 11 through a communication section 25. After receiving the music data from the music delivery server 11 via the communication section 25 in response to the delivery request signal, the control section 20 writes the received music data to the storage medium 21 for storage.

When the control section 20 recognizes that the user has performed an operation on the operation section 24 to reproduce music data from the storage medium 21, the control section 20 retrieves the music data accordingly from the storage medium 21 and inputs the retrieved data to an audio processing section 26. Under control of the control section 20, the audio processing section 26 acquires an audio signal by subjecting the input music data to such processes as decoding, digital-to-analog conversion, and amplification. The audio processing section 26 then outputs music based on the audio signal through an audio output section 28.

Furthermore, when the control section 20 recognizes that the operation section 24 is operated to designate music data to be transferred from the storage medium 21 to the portable music reproduction apparatus 14 (the music data may be called the transfer music data where appropriate), the control section 20 creates a transfer list listing the transfer music data and writes the created list to the storage medium 21. When the portable music reproduction apparatus 14 is connected to an external connection section 29, the control section 20 reads the transfer music data from the storage medium 21 in accordance with the transfer list held on the medium 21. The retrieved music data is transferred to the portable music reproduction apparatus 14 via the external connection section 29.

In the manner described above, the music reproduction terminal 13 acquires music data from the music delivery server 11, stores the acquired music data onto the storage medium 21, reproduces the music data from the storage medium 21, and transfers the music data from the storage medium 21 to the portable music reproduction apparatus 14.

Figure 4:
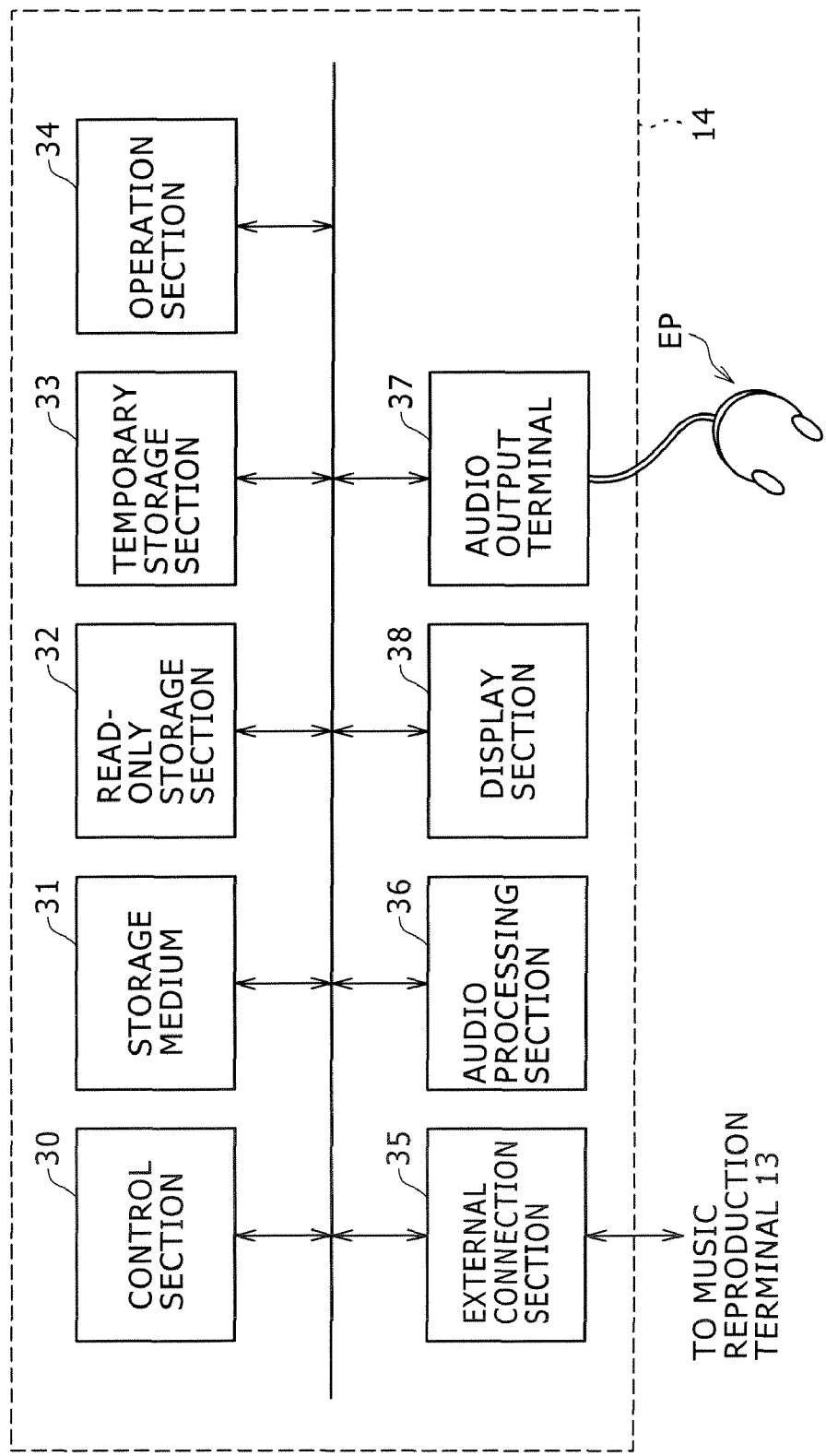
FIG. 4 is a schematic view showing a structure of a portable music reproduction apparatus.

The structure of the portable music reproduction apparatus 14 will now be described with reference to FIG. 4. In the portable music reproduction apparatus 14, a control section 30 controls the apparatus as a whole and performs diverse processes in keeping the programs retrieved from a storage medium 31 composed of a storage apparatus such as hard disk drive or from a read-only storage section 32 such as a ROM. The programs and data handled during the processes are held as needed in a temporary storage section 33 such as a RAM. An apparatus ID for uniquely identifying the portable music reproduction apparatus 14 is written to the read-only storage section 32 at the time of shipment. The music data transferred from the music reproduction terminal 13 connected to an external connection section 35 is written to the storage medium 31 in the portable music reproduction apparatus 14.

When the control section 30 recognizes that the portable music reproduction apparatus 14 is disconnected from the music reproduction terminal 13 and that an operation section 34 is operated to reproduce music data, the control section 30 retrieves the music data accordingly from the storage medium 31 and inputs the retrieved data to an audio processing section 36. Under control of the control section 30, the audio processing section 36 acquires an audio signal by subjecting the input music data to such processes as decoding, digital-to-analog conversion, and amplification. The audio processing section 36 then outputs music based on the audio signal through earphones EP plugged into an audio output terminal 37.

The control section 30 further causes a display section 38 to display such information as a list of titles of the music data stored on the storage medium 31, the title of the piece of music being reproduced, the names of artists, playing times, formats, and bit rates involved. The display is given on the basis of related information attached to the music data held on the storage medium 31 (e.g., titles, album names, artist names, playing times, formats, and bit rates).

In the manner described above, the portable music reproduction apparatus 14 writes to the storage medium 31 the music data transferred from the music reproduction terminal 13, and reproduces the music data from the storage medium 31.

(1-4) Content Management of the Portable Music Reproduction Apparatus

The content management scheme of the portable music reproduction apparatus 14 will now be described in specific terms. As discussed above, the portable music reproduction apparatus 14 is arranged to utilize the storage medium 31 for storing and managing music data that constitutes content data. In practice, as shown in FIG. 5, the portable music reproduction apparatus 14 has a hierarchical folder structure formed on the storage medium 31 with a music folder Fo2 held in a root folder Fo1. Music data files Mf (also called music files) are stored in the music folder Fo2.

That is, the portable music reproduction apparatus 14 designates the node of the music files Mf inside the music folder Fo2 and recognizes such music files as Mf1, Mf2, Mf3, etc., in the music folder Fo2 as the music files Mf ready to be reproduced. For the portable music reproduction apparatus 14, the music files Mf1, Mf2, Mf3, etc., in the music folder Fo2 are regarded as reproducible music files Mf. For example, one music file Mf holds music data constituting a single song.

(1-5) Transfer of Music Data

What follows is a specific explanation of how music data is transferred from the music reproduction terminal 13 to the portable music reproduction apparatus 14. It is assumed that prior to the transfer, the music reproduction terminal 13 has a plurality of music data delivered from the music delivery server 11 and stored on the storage medium 21. It is also assumed that the portable music reproduction apparatus 14 was previously connected to equipment other than the music reproduction terminal 13 and that a dedicated application installed in the connected equipment has caused, say, three music data transferred from the equipment to be stored as music files Mf1, Mf2 and Mf3 into the music folder Fo2 on the storage medium 31, as shown in FIG. 6A.

Under the above assumptions, the portable music reproduction apparatus 14 may be connected to the music reproduction terminal 13. The connection causes the music reproduction terminal 13 to search for music files Mf on the storage medium 31 of the portable music reproduction apparatus 14. In practice, the music reproduction terminal 13 requests the portable music reproduction apparatus 14 to search for any music files Mf that may be stored on the storage medium 31.

As a result of the search, music files Mf1 (001.mp3), Mf2 (002.mp3), and Mf3 (003.mp3) may be found in the music folder Fo2 as shown in FIG. 6B. In that case, the portable music reproduction apparatus 14 returns the absolute paths of the detected music files, e.g., "./root/music/001.mp3 for Mf1," "./root/music/002.mp3" for Mf2, and "./root/music/003.mp3" for Mf3, to the music reproduction terminal 13 as the result of the search.

The music reproduction terminal 13 stores illustratively onto the storage medium 21 the absolute paths "./root/music/001.mp3," "./root/music/002.mp3," and "./root/music/003.mp3" returned from the portable music reproduction apparatus 14 as the outcome of the search. By analyzing the returned absolute paths, the music reproduction terminal 13 determines that the node of the music files Mf3 ("***.mp3" in this case) set in the portable music reproduction apparatus 14 is "./root/music/," i.e., inside the music folder Fo2. The music reproduction terminal 13 then designates the music folder Fo2 as the transfer destination folder for use when transferring music data to the portable music reproduction apparatus 14.

Figures 7A, 7B:
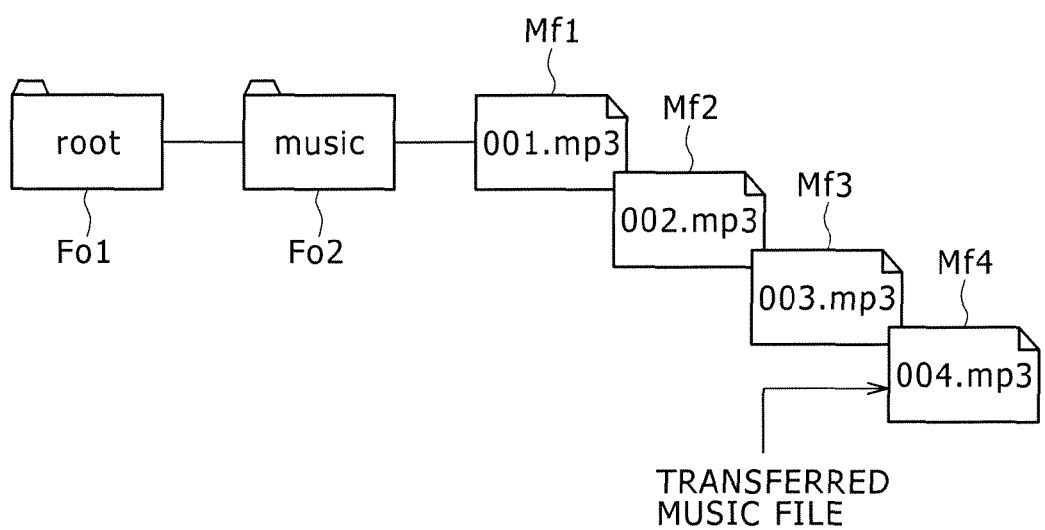
FIGS. 7A and 7B are schematic views showing folder contents after transfer.

The music reproduction terminal 13 reads from the storage medium 21 the music data designated by the user to be transferred to the portable music reproduction apparatus 14, and transfers the retrieved music data to the music folder Fo2 set as the transfer destination folder in the portable music reproduction apparatus 14. As a result, as shown in FIGS. 7A and 7B, the music data transferred from the music reproduction terminal 13 is stored illustratively as a new music file Mf4 (004.mp3) into the music folder Fo2 (./root/music/) of the portable music reproduction apparatus 14.

As described, the music reproduction terminal 13 searches for the existing music files Mf in the portable music reproduction apparatus 14 in order to detect the folder in which the music files Mf are being kept. Once the folder accommodating the music files Mf is detected in the portable music reproduction apparatus 14, the music reproduction terminal 13 transfers the target music data to the detected folder ("music folder Fo2" in this case). In this manner, the music reproduction terminal 13 can transfer the music data to the folder in which the existing music files Mf are currently held by the portable music reproduction apparatus 14, i.e., to the folder previously designated by the apparatus 14 to accommodate the music files Mf.

(1-6) Music Data Transfer Procedure

Described below with reference to the sequence diagram of FIG. 8 is the procedure for transferring music data from the music reproduction terminal 13 to the portable music reproduction apparatus 14 as described above. The transfer procedure is constituted by a sequence carried out according to a program retrieved from the storage medium 21 or read-only storage section 22 by the control section 20 of the music reproduction terminal 13 and also in accordance with a program retrieved from the storage medium 31 or read-only storage section 32 by the control section 30 of the portable music reproduction apparatus 14. It is assumed that before the transfer procedure is started, the music reproduction terminal 13 is connected with the portable music reproduction apparatus 14 and that the portable music reproduction apparatus 14 already has the music files Mf1 (001.mp3), Mf2 (002.mp3) and Mf3 (003.mp3) stored in the music folder Fo2 (./root/music/) on the storage medium 31.

As shown in FIG. 8, the control section 20 of the music reproduction terminal 13 may recognize that, having designated the music data to be transferred from among the music data stored on the storage medium 21, the user has performed an operation to transfer the designated music data to the portable music reproduction apparatus 14. In that case, the control section 20 of the music reproduction terminal 13 goes to step SP1 and sends a search request requesting the portable music reproduction apparatus 14 to search for the music files Mf held on the storage medium 31.

On receiving the search request from the music reproduction terminal 13, the control section 30 of the portable music reproduction apparatus 14 goes to step SP2 and searches the storage medium 31 for the music files Mf. With the music files Mf detected, the control section 30 reaches step SP3. In step SP3, the portable music reproduction apparatus 14 returns the absolute paths "./root/music/001.mp3," "./root/music/002.mp3" and "./root/music/003.mp3" of the detected music files Mf1 (001.mp3), Mf2 (002.mp3) and Mf3 (003.mp3), respectively, as the result of the search to the music reproduction terminal 13.

Given the outcome of the search from the portable music reproduction apparatus 14, the control section 20 of the music reproduction terminal 13 goes to step SP4 and determines from the absolute paths "./root/music/001.mp3," "./root/music/002.mp3" and "./root/music/003.mp3" that the music files Mf1 (001.mp3), Mf2 (002.mp3) and Mf3 (003.mp3) are stored in the music folder Fo2 indicated by the absolute path "./root/music/." Following the determination, the control section 20 reaches step SP5.

In step SP5, the control section 20 of the music reproduction terminal 13 designates as the music data transfer destination folder the music folder Fo2 that was recognized in step SP4. With the music data transfer destination folder designated, the control section 20 reaches step SP6. In step SP6, the control section 20 of the music reproduction terminal 13 reads from the storage medium 21 the music data designated to be transferred to the portable music reproduction apparatus 14, and transfers the retrieved music data to the music folder Fo2 designated as the transfer destination folder in the portable music reproduction apparatus 14.

As a result, in step SP7, the music data transferred from the music reproduction terminal 13 is stored into the music folder Fo2 as a music file Mf of the portable music reproduction apparatus 14.

Using the transfer procedure described above, the control section 20 of the music reproduction terminal 13 and the control section 30 of the portable music reproduction apparatus 14 work to have the designated music data transferred from the music reproduction terminal 13 to the portable music reproduction apparatus 14.

(1-7) Operation and Effects of the First Embodiment

Before transferring music data to the portable music reproduction apparatus 14, the music reproduction terminal 13 of the above-described structure detects from the apparatus 14 the music folder Fo2 that currently holds the music files Mf. The music reproduction terminal 13 designates the detected music folder Fo2 as the destination folder for the music data transfer, and transfers the music data to the designated music folder Fo2.

In this manner, the music reproduction terminal 13 allows the target music data to be stored into the same music folder Fo2 that retains the existing music files Mf in the portable music reproduction apparatus 14.

In other words, the music reproduction terminal 13 automatically recognizes the scheme of content management of the portable music reproduction apparatus 14 by determining which folder of the apparatus 14 is currently holding the music files Mf, without bothering the user to carry out complicated operations. The music reproduction terminal 13 then transfers the music data to an appropriate folder (music folder Fo2 in this case) under the content management scheme thus recognized.

Because the music reproduction terminal 13 can transfer music data to the suitable folder according to the manner in which contents are managed by the portable music reproduction apparatus 14, it is possible to avoid situations where the transferred music data cannot be recognized or reproduced by the apparatus 14. As a result, the transferred music data can be reproduced unfailingly by the portable music reproduction apparatus 14.

As described, on the basis of the folder found to retain music data already in the portable music reproduction apparatus 14, the destination folder to which to transfer music data is automatically designated by the inventive arrangements. A folder appropriate to the content management scheme of the portable music reproduction apparatus 14 can be designated as the transfer destination folder, with no need for the user to perform bothersome operations. Thus it is possible to implement the transfer apparatus, transfer method, and transfer program of the invention in such a manner that music data can be transferred with ease to a folder corresponding to the scheme of content management in effect at the destination of the music data transfer.

Figure 9:
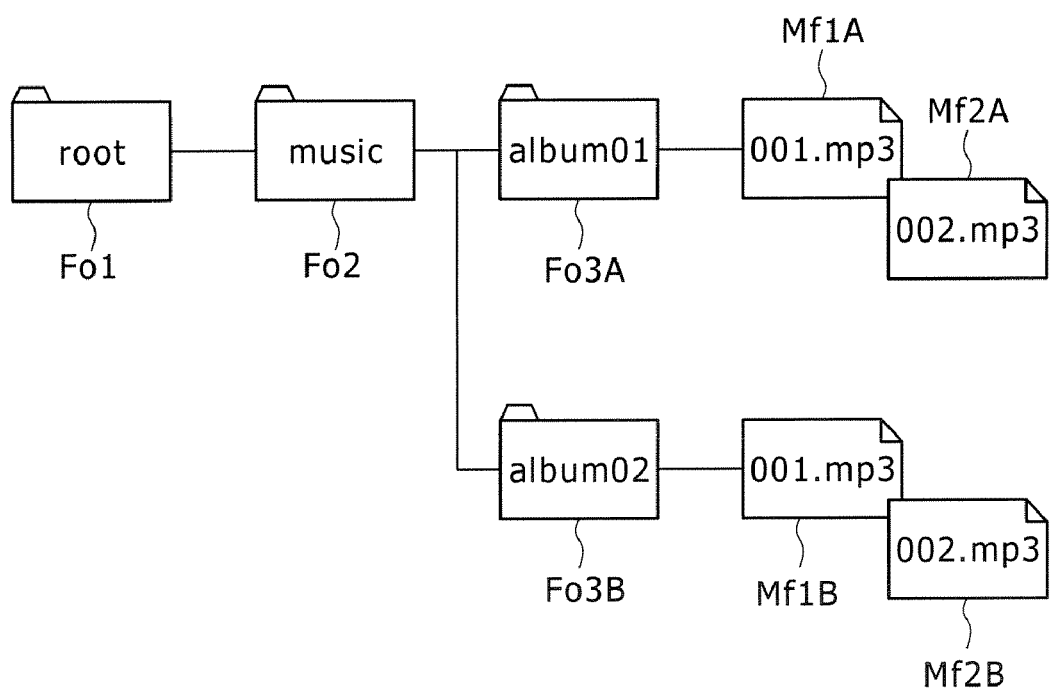
FIG. 9 is a schematic view showing an example in which music files are stored in a plurality of folders in the sibling.

With the first embodiment, as discussed above in reference to FIG. 5, the portable music reproduction apparatus 14 was shown to execute content management such that the music files Mf are stored in a single music folder Fo2 on the storage medium 31. Alternatively, as depicted in FIG. 9, the portable music reproduction apparatus 14 may have another content management scheme under which music files Mf are grouped by album title and stored into album folders Fo3A and Fo3B created within the music folder Fo2.

That is, the portable music reproduction apparatus 14 under the alternative content management scheme may store music folders Mf into a plurality of folders created in a sibling. In that setup, the destination transfer folders are typically designated by the music reproduction terminal 13 as described below.

Illustratively, it is assumed that album folders Fo3A (album01) and Fo3B (album02) are created in the music folder Fo2 on the storage medium 31 of the portable music reproduction apparatus 14, that music files Mf1A (001.mp3) and Mf2A (002.mp3) are stored in the album folder Fo3A, and that music files Mf1B (01.mp3) and Mf2B (002.mp3) are stored in the album folder Fo3B.

Under the assumptions above, the music reproduction terminal 13 may recognize that the user has performed an operation to transfer music data to the portable music reproduction apparatus 14. In that case, as in the above-described transfer procedure (FIG. 8), the music reproduction terminal 13 causes the portable music reproduction apparatus 14 to search for music files Mf and receives from the apparatus 14 the absolute paths of the detected music files Mf as a result of the search. The absolute paths thus acquired are made up of the path "./root/music/album01/001.mp3" of the file Mf1A, path "./root/music/album01/002.mp3" of the file Mf2A, path "./root/music/album02/001.mp3" of the file Mf1B, and path "./root/music/album02/002.mp3" of the file Mf2B.

By analyzing these absolute paths, the music reproduction terminal 13 determines that the node of the music files Mf ("***.mp3" in this case) designated in the portable music reproduction apparatus 14 is in a folder immediately under the path "./root/music/," i.e., in a folder one hierarchy below the music folder Fo2.

Figure 10A:
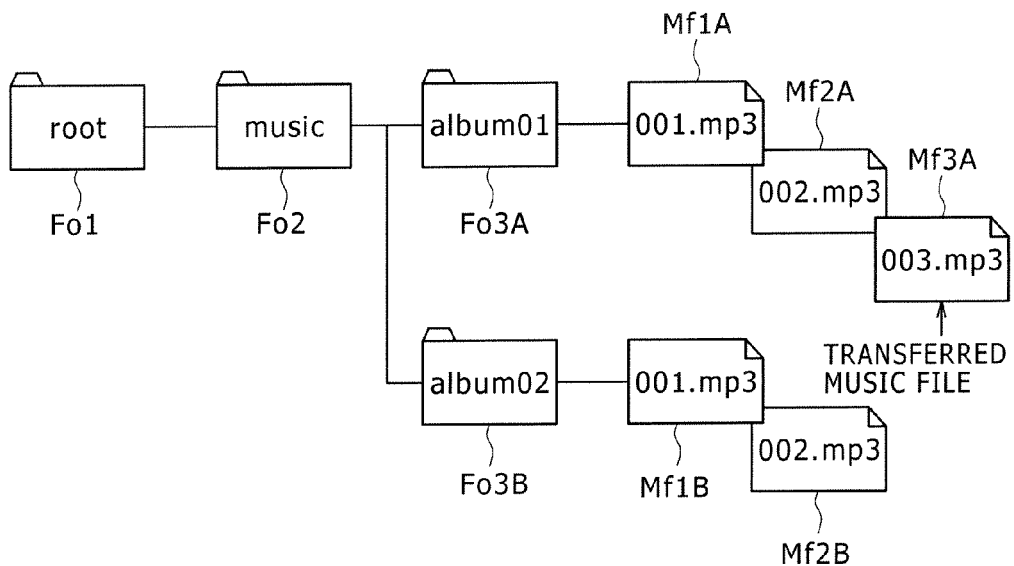
FIGS. 10A and 10B are schematic views showing how the transfer destination folder is designated where music files are stored in a plurality of folders in the sibling.

Illustratively, the music reproduction terminal 13 designates the album folder Fo3A, one of the folders one hierarchy below the music folder Fo2, as the destination folder for use when transferring music data to the portable music reproduction apparatus 14. As a result, as shown in FIG. 10A, the music data transferred from the music reproduction terminal 13 is stored into a new music file Mf3A (003.mp3) in the album folder Fo3A (./root/music/album01/) of the portable music reproduction apparatus 14.

The transfer destination folder is not limited to the album folder Fo3A alone. The music reproduction terminal 13 may alternatively designate the album folder Fo3B in the sibling as the album folder Fo3A, as the transfer destination folder. As another alternative, the music reproduction terminal 13 may cause the portable music reproduction apparatus 14 to create a new album folder Fo3C (album03) under the music folder Fo2 (i.e., in the sibling as the album folders Fo3A and Fo3B), and may designate that folder Fo3C as the transfer destination folder.

Figure 10B:
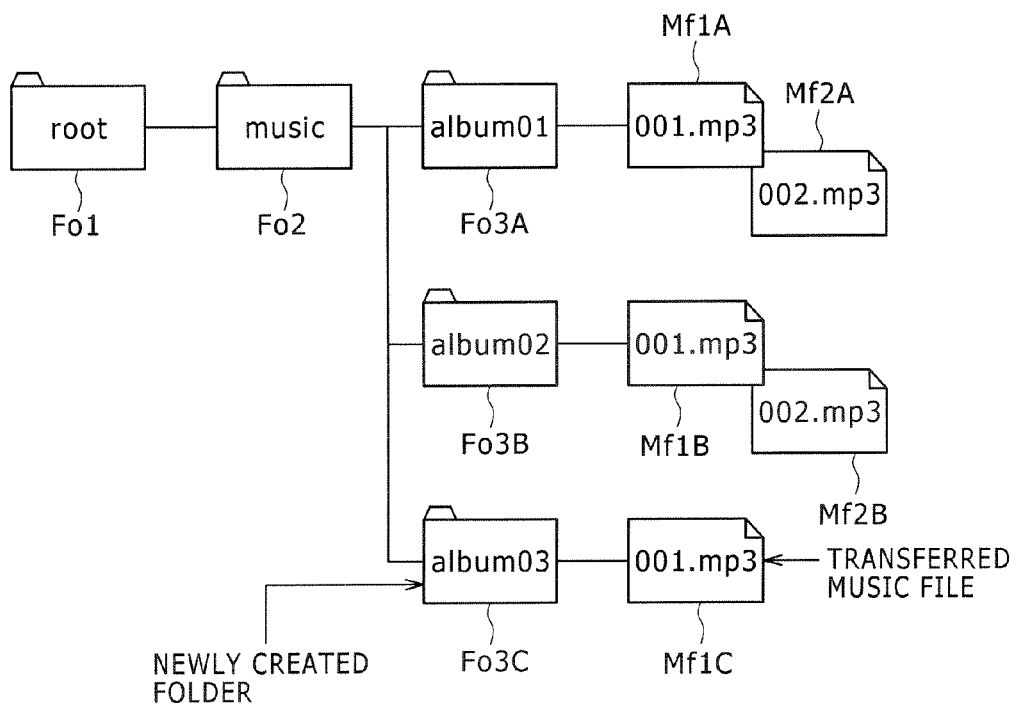

Before designating the album folder Fo3C as the transfer destination folder, the music reproduction terminal 13 causes the portable music reproduction apparatus 14 to create the album Fo3C illustratively on the basis of an album name found in the related information attached to the music data to be transferred. That is, the album folder Fo3C is created anew with its folder name taken from the album name in the related information furnished to the transfer music data. When the music data is transferred to the newly created album folder Fo3C, the music data is stored as a new music file Mf1C (001.mp3) in the album folder Fo3C (./root/music/album03/), as shown in FIG. 10B.

As described, where the portable music reproduction apparatus 14 effects content management such that music files Mf are stored in a plurality of folders created in the sibling, the music reproduction terminal 13 automatically recognizes the scheme of content management of the apparatus 14 without bothering the user to perform complicate operations. The music reproduction apparatus 13 then transfers music data to a folder appropriate to the recognized content management scheme (i.e., to a folder one hierarchy below the music folder Fo2 in this case).

(2) Second Embodiment

The second embodiment of the present invention will now be described in detail. The second embodiment is substantially the same as the above-described first embodiment except for the procedure under which the music reproduction terminal 13 transfers music data to the portable music reproduction apparatus 14. Thus similar details of the second embodiment in terms of the system configuration and of the structures of the music reproduction terminal 13 and portable music reproduction apparatus 14 will not be described further.

Before transferring music data, the music reproduction terminal 13 of the second embodiment detects the format in which music files Mf can be reproduced by the portable music reproduction apparatus 14. The music reproduction terminal 13 then converts the music data to be transferred into the reproducible format for the portable music reproduction apparatus 14 and transfers the converted music data to the apparatus 14. The transfer procedure including such format detection and data conversion will be discussed below with reference to the sequence diagram of FIG. 11. It is assumed that before the transfer procedure is started, the music reproduction terminal 13 is connected with the portable music reproduction apparatus 14 and that the portable music reproduction apparatus 14 already has the music files Mf1 (001.mp3), Mf2 (002.mp3) and Mf3 (003.mp3) compression-encoded based on the MP3 (MPEG Audio Layer-3) standard and stored in the music folder Fo2 (./root/music/) on the storage medium 31.

As shown in FIG. 11, the control section 20 of the music reproduction terminal 13 may recognize that, having designated the music data to be transferred from among the music data stored on the storage medium 21, the user has performed an operation to transfer the designated music data to the portable music reproduction apparatus 14. In that case, the control section 20 of the music reproduction terminal 13 goes to step SP10 and sends a search request requesting the portable music reproduction apparatus 14 to search for the music files Mf held on the storage medium 31.

On receiving the search request from the music reproduction terminal 13, the control section 30 of the portable music reproduction apparatus 14 goes to step SP11 and searches the storage medium 31 for the music files Mf. With the music files Mf detected, the control section 30 reaches step SP12. In step SP12, the portable music reproduction apparatus 14 returns the absolute paths "./root/music/001.mp3," "./root/music/002.mp3" and "./root/music/003.mp3" of the detected music files Mf1 (001.mp3), Mf2 (002.mp3) and Mf3 (003.mp3), respectively, as the result of the search to the music reproduction terminal 13.

Given the outcome of the search from the portable music reproduction apparatus 14, the control section 20 of the music reproduction terminal 13 goes to step SP13 and determines from the absolute paths "./root/music/001.mp3," "./root/music/002.mp3" and "./root/music/003.mp3" that the music files Mf1 (001.mp3), Mf2 (002.mp3) and Mf3 (003.mp3) detected by the portable music reproduction apparatus 14 are stored in the music folder Fo2 indicated by the absolute path "./root/music/." The control section 20 also determines that the music files Mf2, Mf2 and Mf3 are in the MP3 format because of the extension "mp3" found in their absolute paths. Following the determination, the control section 20 reaches step SP14.

As described, the control section 20 of the music reproduction terminal 13 analyzes the absolute paths of the existing music files Mf in the portable music reproduction apparatus 14. The analysis enables the control section 20 to recognize that the node of the music files is in the music folder Fo2 in the portable music reproduction apparatus 14 and that the format in which the music files Mf are reliably reproduced by the apparatus 14 is the MP3 format.

In step SP14, the control section 20 of the music reproduction terminal 13 designates as the music data transfer destination folder the music folder Fo2 that was recognized in step SP13, and sets as the transfer format the MP3 format also recognized in step SP13. With the music data transfer destination folder and the transfer format designated, the control section 20 reaches step SP15. In step SP15, the control section 20 of the music reproduction terminal 13 reads from the storage medium 21 the music data designated to be transferred to the portable music reproduction apparatus 14, and checks to determine whether the format of the music data coincides with the transfer format set in step SP14 (i.e., MP3 format).

If the result of the check in step SP15 is negative, that means the format of the music data designated to be transferred to the portable music reproduction apparatus 14 is something other than the MP3 format (e.g., ATRAC3; registered trademark). In that case, the control section 20 of the music reproduction terminal 13 goes to step SP16 and converts the transfer music data illustratively from ATRAC3 to MP3 format. Specifically, the music data is input to the audio processing section 26 for re-encoding (compression encoding) and other processing whereby the music data is converted into the MP3 format. Step SP16 is followed by step SP17.

In step SP17, the control section 20 of the music reproduction terminal 13 transfers the music data in the MP3 format to the music folder Fo2 designated as the destination folder in the portable music reproduction apparatus 14. In step SP18, the music data transferred in the MP3 format from the music reproduction terminal 13 is stored as a music file Mf into the music folder Fo2 in the portable music reproduction apparatus 14.

If in step SP15 the result of the check is affirmative, that means the music data designated to be transferred to the portable music reproduction apparatus 14 is in the MP3 format, i.e., a format in which the music data can be reproduced by the portable music reproduction apparatus 14. In this case, the control section 20 of the music reproduction apparatus 13 goes to step SP17.

In step SP17, the control section 20 of the music reproduction terminal 13 transfers the music data in the MP3 format to the music folder Fo2 designated as the destination folder in the portable music reproduction apparatus 14. In step SP18, the music data transferred in the MP3 format from the music reproduction terminal 13 is stored as a music file Mf into the music folder Fo2 in the portable music reproduction apparatus 14.

Under the transfer procedure described above, the control section 20 of the music reproduction terminal 13 and the control section 30 of the portable music reproduction apparatus 14 work to have target music data transferred from the music reproduction terminal 13 to the portable music reproduction apparatus 14.

As described, the music reproduction terminal 13 of the second embodiment not only designates the transfer destination folder but also analyzes the extensions of the existing music files Mf in the portable music reproduction apparatus 14 so as to recognize the format in which the music files Mf can be reproduced by the apparatus 14. If the format of the music data to be transferred to the portable music reproduction apparatus 14 is found different from the reproducible format for the apparatus 14, then the music data is converted into the reproducible format before being transferred to the apparatus 14.

In the manner described above, the music reproduction terminal 13 can avoid situations where the music data transferred to the portable music reproduction apparatus 14 cannot be reproduced by the apparatus 14 because of format incompatibility. As a result, the transferred music data can be reproduced by the portable music reproduction apparatus 14 more reliably than before.

In the case of the second embodiment above, the music reproduction terminal 13 was shown analyzing the extensions of the existing music files Mf in the portable music reproduction apparatus 14 so as to recognize and designate the format in which the music files Mf can be reproduced by the apparatus 14. Alternatively, if the existing music files Mf in the portable music reproduction apparatus 14 are furnished with related information indicative of format-related parameters including the format of the files Mf and the bit rate in use, the music reproduction terminal 13 may designate the appropriate transfer format based on the related information.

In the alternative case above, the music reproduction terminal 13 may illustratively derive the related information from those absolute paths of the music files Mf which are returned from the portable music reproduction apparatus 14, the related information being traced to the files Mf.

The foregoing process enables the music reproduction terminal 13 to recognize the format of the existing music files Mf in the portable music reproduction apparatus 14 more accurately than if the terminal 13 attempts to recognize the format from the extensions of these music files Mf. This allows the portable music reproduction apparatus 14 to reproduce the transferred music data more reliably than before. Since the music reproduction terminal 13 designates the transfer format based on the format of the music data Mf and on the related parameters currently stored in the portable music reproduction apparatus 14, the following can be implemented: if the user has had high-bit-rate music files Mf stored in the portable music reproduction apparatus 14 by giving high priority to the sound quality of music data, then the music reproduction terminal 13 can accordingly transfer high-bit-rate music data to the apparatus 14; if the user has had low-bit-rate music files Mf stored in the portable music reproduction apparatus 14 by giving high priority to the number of music data (i.e., a large number of songs), then the music reproduction terminal 13 can accordingly transfer low-bit-rate music data to the apparatus 14. In other words, the music reproduction terminal 13 can convert target music data to the same format and to the same sound quality as those of the existing music data Mf1 in the portable music reproduction apparatus 14, before transferring the converted music data to the apparatus 14.

As another alternative of the foregoing arrangement, the music data to be transferred may be converted to the highest of the bit rates set for the existing music data Mf in a given format in the portable music reproduction apparatus 14.

(3) Other Embodiments

The first and the second embodiments above of the present invention were shown to have music data transferred from the music reproduction terminal 13 to the portable music reproduction apparatus 14. Alternatively, the invention may be applied to other applications in which content data is transferred between diverse types of equipment. Illustratively, in a typical setup according to the invention, video data may be transferred from a video storage equipment that stores video data to a video reproduction equipment that reproduces the video data. In an alternative setup according to the invention, programs may be transferred from a server that stores programs to a personal computer that runs the programs.

In another alternative setup according to the invention, content data may be transferred between a personal computer that retains various kinds of content data on the one hand, and an external storage apparatus such as a hard disk drive externally connected to the personal computer on the other hand. In this setup, the external storage apparatus comes under control of the personal computer once connected to the latter. That means the external storage apparatus has no need for the control section such as the control section 30 of the portable music reproduction apparatus 14. Instead, the control section of the personal computer recognizes the internal storage medium as a first storage medium and the externally connected storage apparatus as a second storage medium. Then all steps of the transfer procedure (i.e., steps SP1 through SP7 in FIG. 7 and steps SP10 through SP18 in FIG. 11) are carried out by the personal computer.

In connection with the first and the second embodiments above, the music reproduction terminal 13 was shown to detect the node of the music files Mf in the portable music reproduction apparatus 14, before designating automatically the folder found to be the node as the transfer destination folder. Alternatively, the music reproduction terminal 13 may present the use with the detected folder as one of the options for the user to choose from in designating the transfer destination folder.

Figure 12:
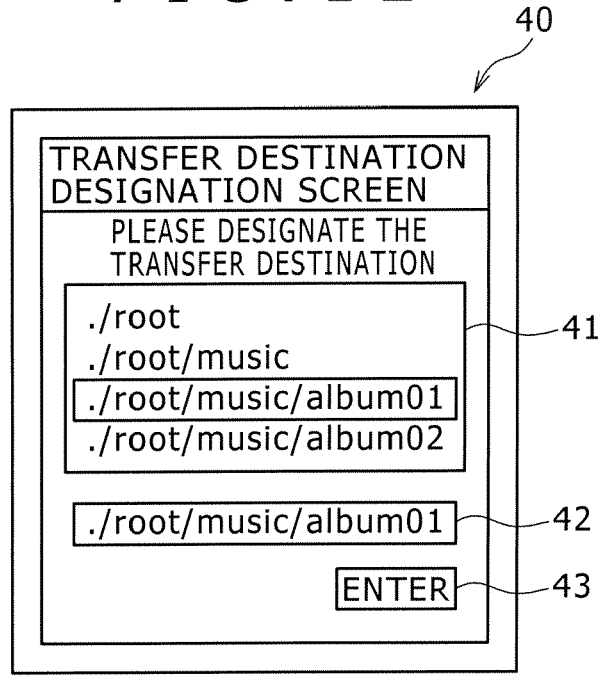
FIG. 12 is a schematic view showing a structure of a transfer destination designation screen of another embodiment of this invention.

In the foregoing case, the music reproduction terminal 13 first detects from the portable music reproduction apparatus 14 the folder that contains music files Mf and then causes the display section 27 to display a transfer destination designation screen 40 prompting the user to designate the destination folder, as shown in FIG. 12. The transfer destination designation screen 40 includes: an option display section 41 that shows absolute paths representative of folders as options for the user to choose from in designating the destination folder; a selected path display section 42 that indicates the absolute path representing the folder selected from among those displayed in the option display section 41; and an enter button 43 used to finalize the absolute path displayed in the selected path display section 42 as the absolute path of the transfer destination folder.

The option display section 41 displays the absolute paths (e.g., ./root/music/album01 and ./root/music/album02) of the folders detected by the music reproduction terminal 13 from the portable music reproduction apparatus 14 as the nodes of music files Mf. In addition to these absolute paths, the option display section 41 may alternatively display such options as the absolute path (e.g., ./root/music) of the folder one hierarchy above the detected folders and the absolute path (e.g., ./root) of the folder designated beforehand as the default destination folder. The selected path display section 42 displays the absolute path of the folder selected from the option display section 41. The selected path display section 42 provides its display in such a manner that the user may edit what is being displayed.

The music reproduction terminal 13 thus presents the user with the options to choose from in designating the transfer designation folder. In addition to the optional destination folders, the music reproduction terminal 13 may present the user with a folder or folders as further alternatives to these options. In this manner, after detecting from the music reproduction terminal 13 a plurality of folders as the nodes for music files Mf, the music reproduction terminal 13 allows the user easily to select one of the detected folders as the transfer destination folder. If the user is familiar with the content management scheme of the portable music reproduction apparatus 14, the user will be offered a still higher degree of freedom in designating a desired transfer destination folder.

In the first and the second embodiments above, the portable music reproduction apparatus 14 was shown to store the music files Mf in only one format (i.e., MP3), as described with reference to FIGS. 6 and 9. Alternatively, the portable music reproduction apparatus 14 may retain music files Mf in a plurality of formats such as the MP3 format and the ATRAC3 (registered trademark) format. In such a case, the music reproduction terminal 13 may designate as the destination folder to which to transfer music data the folder that currently holds music files Mf in the same format as that of the music data to be transferred.

Figure 13:
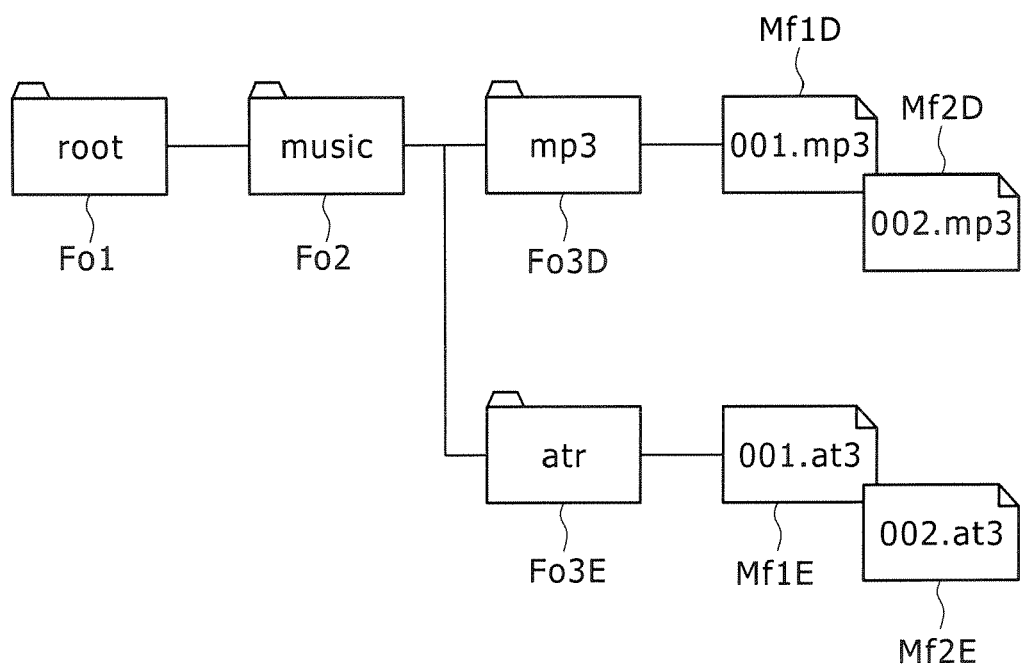
FIG. 13 is a schematic views showing an example in which music files are stored in a plurality of formats.

Illustratively, as shown in FIG. 13, suppose that the storage medium 31 of the portable music reproduction apparatus 14 has an "mp3" folder Fo3D containing music files Mf1D and Mf2D in the MP3 format as well as an "atr" folder Fo3E holding music files Mf1E and Mf2E in the ATRAC3 format. In that case, if the music data to be transferred is in the MP3 format, then the music reproduction terminal 13 detects from the portable music reproduction apparatus 14 the "mp3" folder Fo3D containing the music files Mf1D and Mf2D in the MP3 format, and designates the detected "mp3" folder Fo3D as the transfer destination folder. On the other hand, if the music data to be transferred is in the ATRAC3 format, then the music reproduction terminal 13 detects from the portable music reproduction apparatus 14 the "atr" folder Fo3E holding the music files Mf1E and Mf2E in the ATRAC3 format, and designates the detected "atr" folder Fo3E as the transfer destination folder.

In the manner described above, the music reproduction terminal 13 can designate as the destination folder the folder that contains the music files Mf in the same format as that of the music data to be transferred. As a result, the music reproduction terminal 13 can transfer music data to a folder appropriate to the content management scheme of the portable music reproduction apparatus 14.

Where there is a possibility that the portable music reproduction apparatus 14 may have music files Mf stored inside in a plurality of formats, the music reproduction terminal 13 may cause the portable music reproduction apparatus 14 to search for music files M1 in the same format as that of the music data to be transferred as well as for music files M1 in a format into which the target music data may be converted. If music files Mf in the same format as that of the music data to be transferred are detected, the folder in which the detected files are found may be designated as the transfer destination folder. It might happen that music files Mf in the same format are not found while music files Mf in a format into which the target music data may be converted have been detected. In that case, the folder containing the detected music files Mf may be designated as the transfer destination folder.

The inventive arrangements above may be applied not only to the music transfer system 10 for allowing music data in a plurality of formats to be transferred and stored, but also to an extensive range of content transfer systems whereby multiple types of content data such as music data combined with video data, and video data in conjunction with programs may be transferred and stored.

In the first and the second embodiments above, the music reproduction terminal 13 was shown detecting the folder of existing music files Mf in the portable music reproduction apparatus 14 before transferring music data to the apparatus 14. Alternatively, the music reproduction terminal 13 may detect the folder representative of the node of the existing music files Mf in the portable music reproduction apparatus 14 at the moment the portable music reproduction apparatus 14 is found connected to the terminal 13.

With the foregoing embodiments, every time the music reproduction terminal 13 transferred music data to the portable music reproduction apparatus 14, or every time the portable music reproduction apparatus 14 was found connected, the music reproduction terminal 13 was shown to detect the folder containing the existing music files Mf in the apparatus 14 and to designate the transfer destination folder accordingly. Alternatively, the absolute path of the destination folder designated upon initial transfer of music data to the portable music reproduction apparatus 14 may be stored on the storage medium 21 of the music reproduction terminal 13 in association with the apparatus ID acquired from the apparatus 14. Next time the music reproduction terminal 13 transfers music data to the portable music reproduction apparatus 14 having the same apparatus ID, the terminal 13 may effect the transfer to the destination folder identified by the absolute path retrieved with the help of the apparatus ID from the storage medium 21.

That is, the folder currently retaining the existing music files Mf in the portable music reproduction apparatus 14 need only be detected once in order to designate the transfer destination folder. The process of setting the destination folder can subsequently be skipped. This shortens the actual time it takes to transfer music data. It is also possible to store on the storage medium 21 not only the identity of the transfer destination folder but also the transfer format in association with the apparatus ID of the portable music reproduction apparatus 14.

The first embodiment above was shown creating a new album folder Fo3C based on the album name found in the related information attached to the music data to be transferred. Alternatively, a new folder may be created on the basis of other information (e.g., title, artist name, etc.) included in the related information.

In the first embodiment, the portable music reproduction apparatus 14 was shown building a hierarchical folder structure on the storage medium 31 where the music folder Fo2 is created under the root folder Fo1. Alternatively, a folder structure of many more hierarchies may be formed on the storage medium 31. As another alternative, a folder structure containing the root folder Fo1 alone (i.e., non-hierarchical structure) may be provided. Even in this case, music data can be transferred to a folder appropriate to the content management scheme of the portable music reproduction apparatus 14 according to the invention.

In the first and the second embodiments above, the storage medium 31 of the portable music reproduction apparatus 14 was shown to be a hard disk drive. Alternatively, the storage medium 31 may be any one of other suitable storage devices including nonvolatile memories. The storage medium 31 may also be a detachable card type (so-called memory card) attached to the portable music reproduction apparatus 14.

With regard to the first and the second embodiments above, no mention was made of cases in which a plurality of folders containing music files Mf would be detected from different hierarchies. In such cases, one of the detected folders may be designated as the transfer destination folder by the user illustratively through the transfer destination designation screen 40. As another alternative, the folder holding the largest number of music files Mf may be arranged to be designated as the destination folder.

In the second embodiment above, the music reproduction terminal 13 was shown to designate the format in which to transfer music data to the portable music reproduction apparatus 14 by recognizing the format and related parameters of the existing music files Mf in the apparatus 14 on the basis of the related information attached to the music files Mf. As an alternative, a video storage apparatus that retains video data may designate the format in which to transfer video data to a destination by recognizing the format and related parameters of existing video files in the destination video reproduction apparatus on the basis of the related information attached to these video files. In the latter case, the related information about the video files may illustratively include such information as resolution, frame rate, and bit rate. When the related information is acquired, the video storage apparatus may convert the transfer-destined video data into the same format and image quality as those of the existing video files in the destination video reproduction apparatus.

In the first and the second embodiments, the control section 20 of the music reproduction terminal 13 and the control section 30 of the portable music reproduction apparatus 14 were shown executing the above-described transfer procedure in accordance with previously installed programs. Alternatively, the programs for performing the transfer procedure may be recorded on a recording medium such as a CD (Compact Disc) and may be retrieved therefrom at the time of executing the procedure.

With regard to the foregoing embodiments of the invention, the music reproduction terminal 13 was shown constituted by the control section 20, storage medium 21, read-only storage section 22, temporary storage section 23, operation section 24, communication section 25, audio processing section 26, display section 27, audio output section 28, and external connection section 29. Alternatively, the music reproduction terminal 13 may be structured in diverse ways using other suitable components as long as the components have functions substantially similar to those of the above-described component sections.

It should be noted that the storage section 2 in the transfer apparatus 1 of FIG. 1 corresponds to the storage apparatus 21 in the music reproduction terminal 13 of FIG. 3. Likewise, the communication section 3 of the apparatus 1 (FIG. 1) corresponds to the external connection section 29 of the terminal 13 (FIG. 4), the control section 4 (FIG. 1) to the control section 20 (FIG. 4), the display section 5 (FIG. 1) to the display section 27 (FIG. 3), and the conversion section 6 (FIG. 1) to the audio processing section 26 (FIG. 3).

The present invention, as described, may be applied illustratively to transfer apparatuses for transferring content data for use with personal computers and hard disk recorders.

It should be understood by those skilled in the art that various modifications, combinations, sub-combinations and alterations may occur depending on design requirements and other factors insofar as they are within the scope of the appended claims or the equivalents thereof.

What is claimed is:

1. A transfer apparatus, comprising:
a storage section configured to store a plurality of content data;
a communication section configured to receive, from an external equipment, information identifying a plurality of sibling nodes of a hierarchical structure of the external equipment, the plurality of sibling nodes retaining content data of a same type as a type of one of the plurality of content data; and
a control section configured to create, upon a reception by the communication section of the information identifying the plurality of sibling nodes, under a common parent node of the plurality of sibling nodes in the hierarchical structure of the external equipment, a child node of the common parent node, and to control a transfer of the one of the plurality of content data to the child node of the common parent node.

2. The transfer apparatus according to claim 1, wherein the one of the plurality of content data is associated with related information about the one of the plurality of content data, and said control section is further configured to create the child node based on said related information.

3. The transfer apparatus according to claim 2, wherein the related information is defined by an album name associated with the one of the plurality of content data.

4. The transfer apparatus according to claim 1, wherein said control section is further configured to cause a display section to display the plurality of sibling nodes and to control a transfer of the one of the plurality of content data to one of the plurality of the sibling nodes based on an input from an operation section in response to a display of the plurality of sibling nodes.

5. The transfer apparatus according to claim 1, wherein said type of the content data retained by the plurality of sibling nodes is defined by a format, and the one of the plurality of content data has a same format as the format.

6. The transfer apparatus according to claim 1, wherein said external equipment has unique equipment identification information, and when said control section designates said child node, said control section associates said child node with said unique equipment identification information acquired from said external equipment and stores said child node in association with said unique equipment identification information into said storage section.

7. The transfer apparatus according to claim 6, wherein the transfer apparatus transfers other content data to the child node based on the unique equipment identification information.

8. The transfer apparatus according to claim 1, further comprising:
a conversion section configured to convert a format of the one of the plurality of content data, wherein, said control section is configured to search for content data in logical nodes in the hierarchical structure of said external equipment for a format in use, and
if the format in use is different from the format of the one of the plurality of content data, said control section causes said conversion section to convert the format of the one of the plurality of content data into the format in use, before transferring the one of the plurality of content data to said external equipment.

9. The transfer apparatus according to claim 8, wherein said conversion section is configured to compression-encode the one of the plurality of content data and to decode the one of the plurality of content data.

10. The transfer apparatus according to claim 1, wherein the type of the one of the plurality of content data is defined by a file extension.

11. A transfer method implemented by a transfer apparatus, comprising:
receiving, from a communicable external equipment, information indicating a plurality of sibling nodes of a hierarchical structure of the communicable external equipment, the plurality of sibling nodes retaining content data of a same type as a type of content data to be transferred to said communicable external equipment;
creating, upon the receiving the information indicating the plurality of sibling nodes, with the transfer apparatus, a child node of a common parent node of the plurality of sibling nodes in the hierarchical structure of the communicable external equipment; and
transferring said content data to be transferred to said child node.

12. The transfer method according to claim 11, further comprising:
converting a format of the content data to be transferred into a format of the content data stored in one of the plurality of sibling nodes of the communicable external equipment when the format of the content data stored in the one of the plurality of sibling nodes is different from the format of the content data to be transferred to said external equipment.

13. A computer program product having a transfer program with instructions that when executed by a processor implement a procedure for causing a transfer apparatus to perform a method comprising:
receiving, from a communicable external equipment, data identifying a plurality of sibling nodes of a hierarchical structure of the communicable external equipment, the plurality of sibling nodes retaining content data of a same type as a type of content data to be transferred to the communicable external equipment;
creating upon the receiving the data identifying the plurality of sibling nodes, a child node of a common parent node of the plurality of sibling nodes in the hierarchical structure of the communicable external equipment; and
transferring said content data to be transferred to said child node.

14. The computer program product according to claim 13, the method further comprising:
converting a format of the content data to be transferred into a format of the content data stored in one of the plurality of sibling nodes of the communicable external equipment when the format of the content data stored in the one of the plurality of sibling nodes is different from the format of the content data to be transferred to the child node of the external equipment.

* * * * *